US010196207B2

(12) United States Patent
Keating et al.

(10) Patent No.: US 10,196,207 B2
(45) Date of Patent: Feb. 5, 2019

(54) AUTOMATED STORAGE AND RETRIEVAL SYSTEM STRUCTURE

(71) Applicant: Symbotic, LLC, Wilmington, MA (US)

(72) Inventors: John F. Keating, Billerica, MA (US); Thomas G. Perry, Pepperell, MA (US); William Johnson, Jr., Andover, MA (US); Todd E. Kepple, Litchfield, NH (US); Lawrence A. Margagliano, Boylston, MA (US)

(73) Assignee: Symbotic, LLC, Wilmington, MA (US)

( * ) Notice: Subject to any disclaimer, the term of this patent is extended or adjusted under 35 U.S.C. 154(b) by 0 days.

(21) Appl. No.: 15/231,340

(22) Filed: Aug. 8, 2016

(65) Prior Publication Data

US 2016/0347541 A1 Dec. 1, 2016

Related U.S. Application Data

(63) Continuation of application No. 14/209,209, filed on Mar. 13, 2014, now Pat. No. 9,409,709.

(60) Provisional application No. 61/780,363, filed on Mar. 13, 2013.

(51) Int. Cl.
*B65G 1/00* (2006.01)
*B65G 1/02* (2006.01)
*B65G 1/04* (2006.01)

(52) U.S. Cl.
CPC .............. *B65G 1/02* (2013.01); *B65G 1/0492* (2013.01); *B65G 2207/20* (2013.01)

(58) Field of Classification Search
None
See application file for complete search history.

(56) References Cited

U.S. PATENT DOCUMENTS

| 3,745,726 | A |   | 7/1973  | Thom |
|-----------|---|---|---------|------|
| 4,168,780 | A |   | 9/1979  | Parrott |
| 4,285,436 | A |   | 8/1981  | Konstant et al. |
| 4,428,708 | A | * | 1/1984  | Burt ............... B65G 1/0421 414/275 |
| 5,002,449 | A |   | 3/1991  | Kita et al. |
| 5,370,492 | A |   | 12/1994 | Gleyze et al. |
| 5,397,005 | A |   | 3/1995  | Taccolini |
| 5,445,080 | A |   | 8/1995  | Austin |
| 5,611,181 | A |   | 3/1997  | Shreiner et al. |
| 5,644,879 | A |   | 7/1997  | Shreiner et al. |
| 5,967,728 | A |   | 10/1999 | Gales et al. |
| 6,149,366 | A |   | 11/2000 | Deandrea |
| 6,158,566 | A |   | 12/2000 | Pollock |
| 6,290,074 | B1 |  | 9/2001  | Syvuk et al. |
| 6,360,673 | B1 |  | 3/2002  | Herrin et al. |

(Continued)

FOREIGN PATENT DOCUMENTS

EP 1086910 3/2001
JP 56012204 2/1981

(Continued)

*Primary Examiner* — Kavel Singh
(74) *Attorney, Agent, or Firm* — Perman & Green, LLP

(57) ABSTRACT

An automated storage and retrieval system includes an autonomous rover and a multilevel rack structure. The multilevel rack structure includes columns connected by rail beams transversely spanning between the columns. The rail beams define storage and transport levels and provide riding surfaces for the autonomous rover. The rail beams include integral fatigue resistant rover location apertures.

20 Claims, 15 Drawing Sheets

(56) References Cited

U.S. PATENT DOCUMENTS

| | | | |
|---|---|---|---|
| 6,390,756 B1 | 5/2002 | Isaacs et al. | |
| 6,672,573 B2 | 1/2004 | Berton | |
| 7,025,191 B2 | 4/2006 | Litchti et al. | |
| 7,080,725 B2 | 7/2006 | Hishinuma | |
| 7,204,669 B2 | 4/2007 | Cho et al. | |
| 7,252,454 B2 | 8/2007 | Bradford et al. | |
| 7,395,570 B2 | 7/2008 | Bradford et al. | |
| 7,991,505 B2 * | 8/2011 | Lert, Jr. | B65G 1/0492 198/347.1 |
| 8,015,760 B2 | 9/2011 | Kemeny | |
| 8,425,173 B2 * | 4/2013 | Lert | B65G 1/045 414/280 |
| 2001/0005961 A1 | 7/2001 | Fukuta et al. | |
| 2004/0255535 A1 | 12/2004 | Herren | |
| 2008/0288104 A1 | 11/2008 | Shani | |
| 2010/0068022 A1 | 3/2010 | Aschauer et al. | |
| 2010/0281807 A1 | 11/2010 | Bradford | |
| 2012/0189411 A1 | 7/2012 | Yoshinaga | |

FOREIGN PATENT DOCUMENTS

| | | |
|---|---|---|
| JP | 05286514 | 11/1993 |
| JP | 08290809 | 11/1996 |
| JP | 10007216 | 1/1998 |
| JP | 10059511 | 3/1998 |
| JP | 10139117 | 5/1998 |
| JP | 11124210 | 5/1999 |
| JP | 11190146 | 7/1999 |
| JP | 2000110398 | 4/2000 |
| JP | 2000142930 | 5/2000 |
| JP | 2000351417 | 12/2000 |
| JP | 2000351424 | 12/2000 |
| JP | 2002037426 | 2/2002 |
| JP | 2002068429 | 3/2002 |
| JP | 2002068430 | 3/2002 |
| JP | 2003300608 | 10/2003 |
| JP | 2004010189 | 1/2004 |
| JP | 2004027815 | 1/2004 |
| JP | 2008290807 | 12/2008 |
| JP | 2009203053 | 9/2009 |
| WO | 2008152245 | 12/2008 |

* cited by examiner

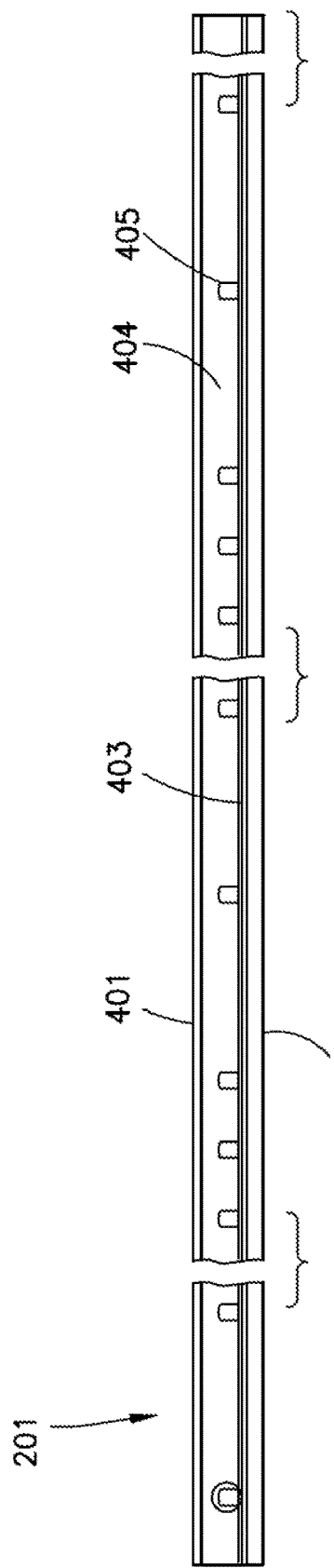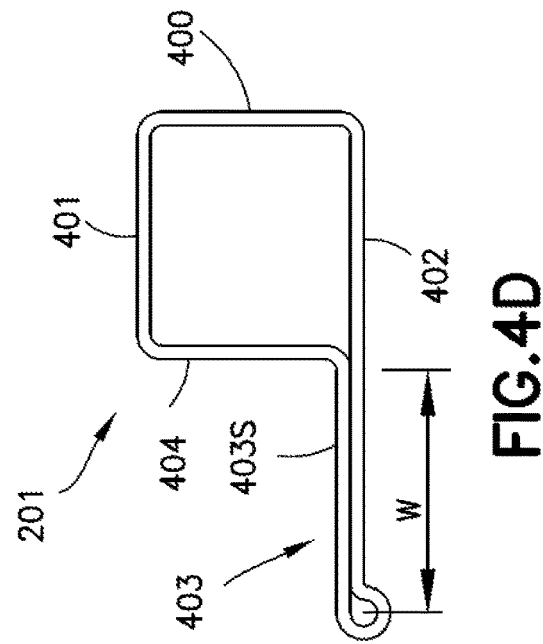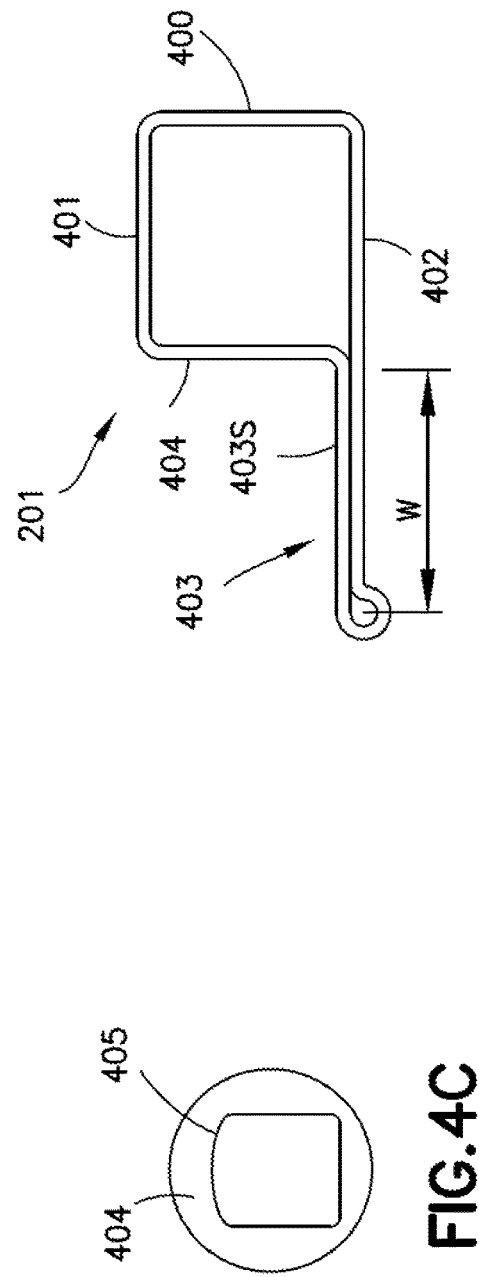

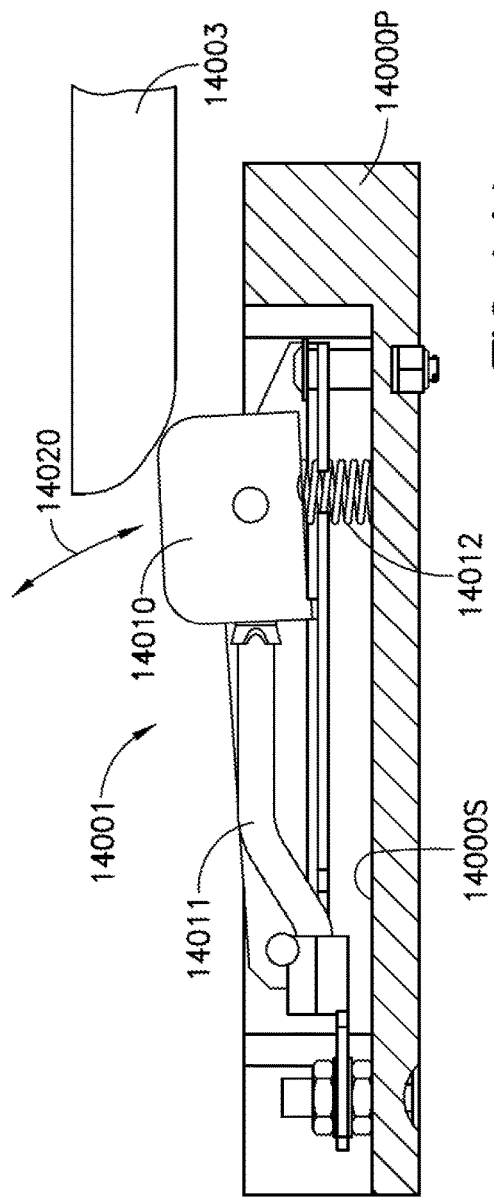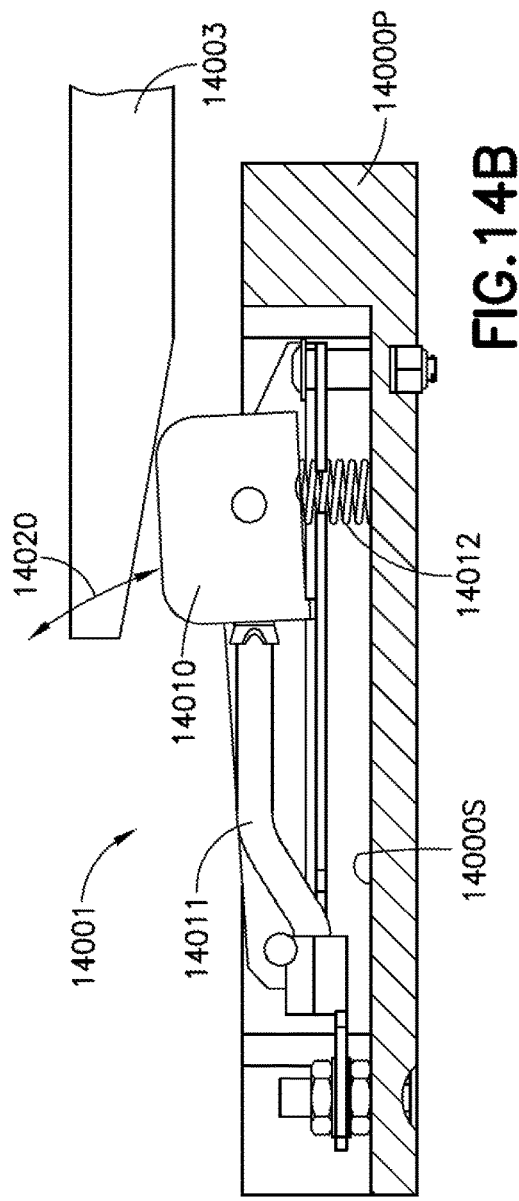

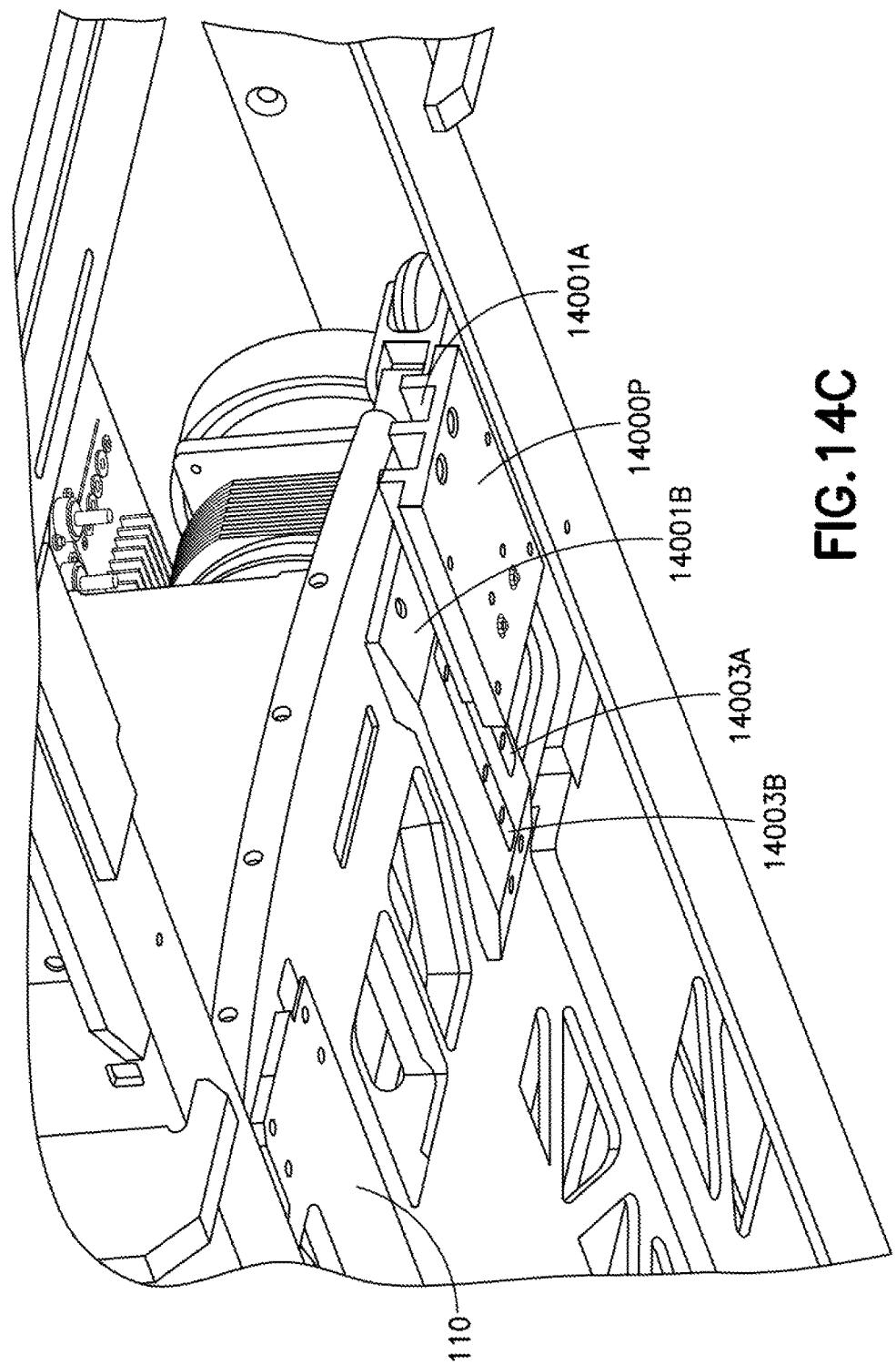

AUTOMATED STORAGE AND RETRIEVAL SYSTEM STRUCTURE

CROSS REFERENCE TO RELATED APPLICATIONS

This application is a continuation of U.S. application Ser. No. 14/209,209 filed Mar. 13, 2014 (now U.S. Pat. No. 9,409,709) which is a non-provisional of and claims the benefit of U.S. Provisional Patent Application No. 61/780,363 filed on Mar. 13, 2013, the disclosures of which are incorporated herein by reference in their entireties.

BACKGROUND

1. Field

The exemplary embodiments generally relate to material handling systems and, more particularly, to the structure of a storage and retrieval system.

2. Brief Description of Related Developments

Material handling systems such as, for example, automated storage and retrieval systems, cycle storage items to storage locations (e.g. shelves of a storage rack) in a storage array of an automated warehouse or store. Storage racks with dynamically allocated storage locations may expect to be subject to a higher number of load cycles during a life span/term of the automated storage and retrieval system, because of the higher usage rate of each potential storage location, when compared to conventional storage racks (where storage locations are fixed at predetermined locations of the shelves). Conventional storage structures have generally neglected fatigue concerns, and to the limited extent fatigue loads have been incorporated into the design of the conventional storage structure, such loads appear to be related to gross storage loads on the structure, rather than loading from automation (e.g. loads from automated material handlers with various payloads traversing the storage structure or payload transfer actions).

Also, conventional automated storage and retrieval systems may provide for the scanning of items after a seismic or other event that may cause movement of the stored items. Automation may be used to determine the position of the affected storage items so that the items can be moved to their correct positions. Generally, this scanning is done to facilitate recovery of the automated storage and retrieval system once the automated storage and retrieval system is shut down as a result of the seismic or other event.

It would be advantageous to have a storage structure that incorporates fatigue considerations with respect to loading from automation of the automated storage and retrieval system. It would also be advantageous to have a storage structure that facilitates maintaining operation after a seismic or other event that may cause movement of the stored items.

BRIEF DESCRIPTION OF THE DRAWINGS

The foregoing aspects and other features of the disclosed embodiment are explained in the following description, taken in connection with the accompanying drawings, wherein:

FIG. 4A-4D are schematic illustrations of a rover travel rail in accordance with aspects of the disclosed embodiment;

FIGS. 14A-14C are schematic illustrations of a rover charging contact in accordance with aspects of the disclosed embodiment.

DETAILED DESCRIPTION

Figure 1:
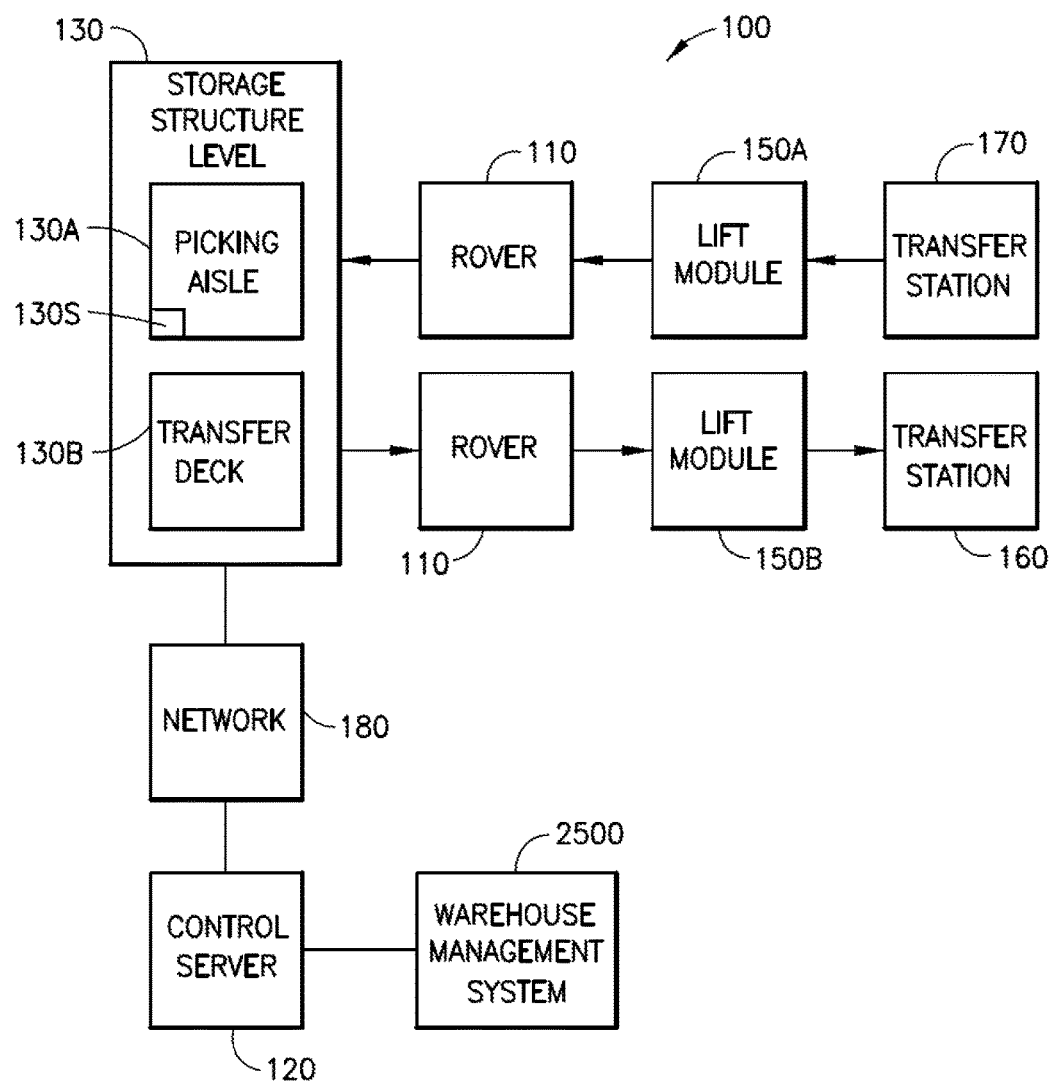
FIG. 1 is a schematic illustration of an automated storage and retrieval system in accordance with aspects of the disclosed embodiment.

FIG. 1 is a schematic illustration of an automated storage and retrieval system in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety.

The automated storage and retrieval system 100 may include in-feed and out-feed transfer stations 170, 160, input and output vertical lift modules 150A, 150B (generally referred to as lift modules 150), a storage structure 130, and a number of autonomous rovers 110. The storage structure 130 may include multiple levels of storage rack modules where each level includes respective storage or picking aisles 130A having rover travel surfaces (as will be described below), and transfer decks 130B for transferring case units between any of the storage areas (e.g. disposed on storage shelves 130S located on one or more sides of the picking aisles 130A) of the storage structure 130 and any shelf of the lift modules 150. The storage aisles 130A, and transfer decks 130B are also configured to allow the rovers 110 to traverse the storage aisles 130A and transfer decks 130B for placing case units into picking stock and to retrieve ordered case units.

The rovers 110 may be any suitable autonomous vehicles capable of carrying and transferring case units throughout the storage and retrieval system 100. In one aspect the rovers 110 may be automated, independent (e.g. free riding) rovers. Suitable examples of rovers can be found in, for exemplary purposes only, U.S. patent application Ser. No. 13/326,674 filed on Dec. 15, 2011; U.S. patent application Ser. No. 12/757,312 filed on Apr. 9, 2010 (U.S. Pat. No. 8,425,173); U.S. patent application Ser. No. 13/326,423 filed on Dec. 15, 2011; U.S. patent application Ser. No. 13/326,447 filed on Dec. 15, 2011 (now U.S. Pat. No. 8,965,619); U.S. patent application Ser. No. 13/326,505 Dec. 15, 2011 (now U.S. Pat. No. 8,696,010); U.S. patent application Ser. No. 13/327,040 filed on Dec. 15, 2011 (now U.S. Pat. No. 9,187,244); U.S. patent application Ser. No. 13/326,952 filed on Dec. 15, 2011; and U.S. patent application Ser. No. 13/326,993 filed on Dec. 15, 2011, the disclosures of which are incorporated by reference herein in their entireties. The rovers 110 may be configured to place case units, such as the above described retail merchandise, into picking stock in the one or more levels of the storage structure 130 and then selectively retrieve ordered case units for shipping the ordered case units to, for example, a store or other suitable location.

The rovers 110, lift modules 150 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. In one aspect, the control server 120 may include a collection of substantially concurrently running programs that are configured to manage the storage and retrieval system 100 including, for exemplary purposes only, controlling, scheduling, and monitoring the activities of all active system components, managing inventory and pickfaces, and interfacing with the warehouse management system 2500.

Figure 2:
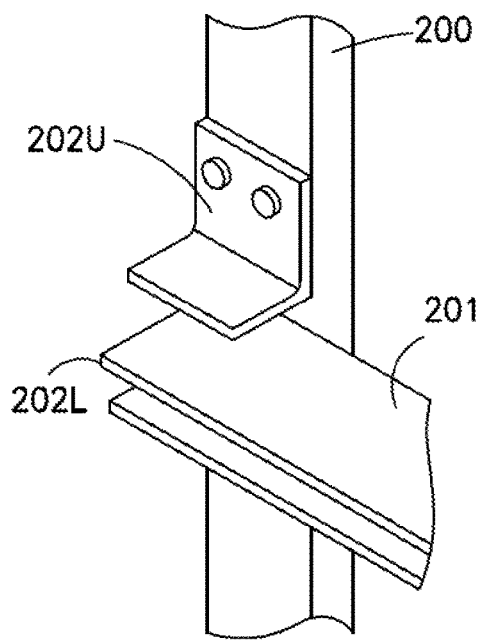
FIGS. 2, 3A and 3B are schematic illustrations of a portion of a storage rack of the automated storage and retrieval system in accordance with aspects of the disclosed embodiment.
Figure 3A:
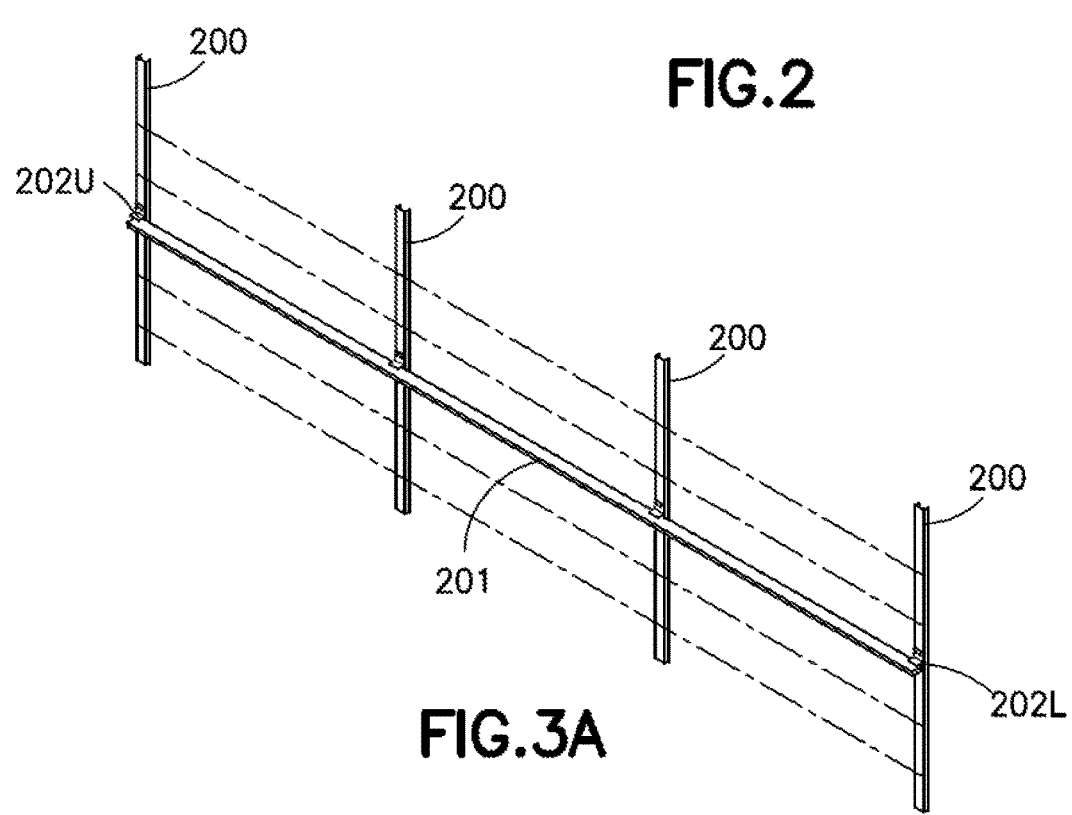
Figure 3B:
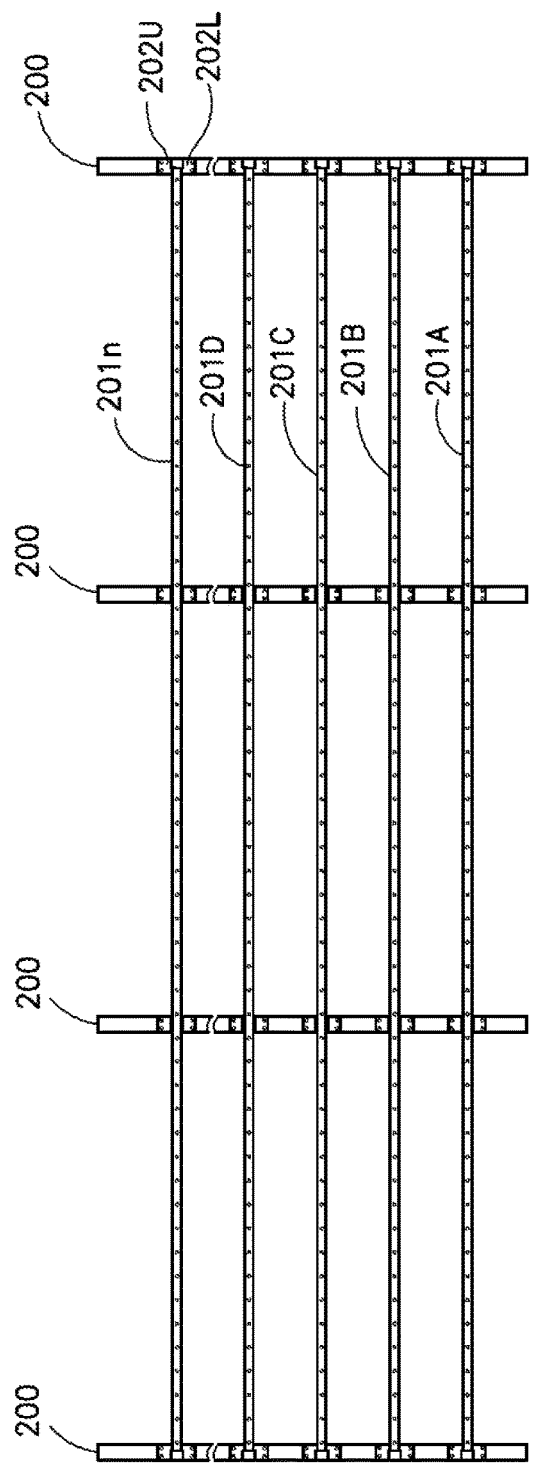
Figure 4A:
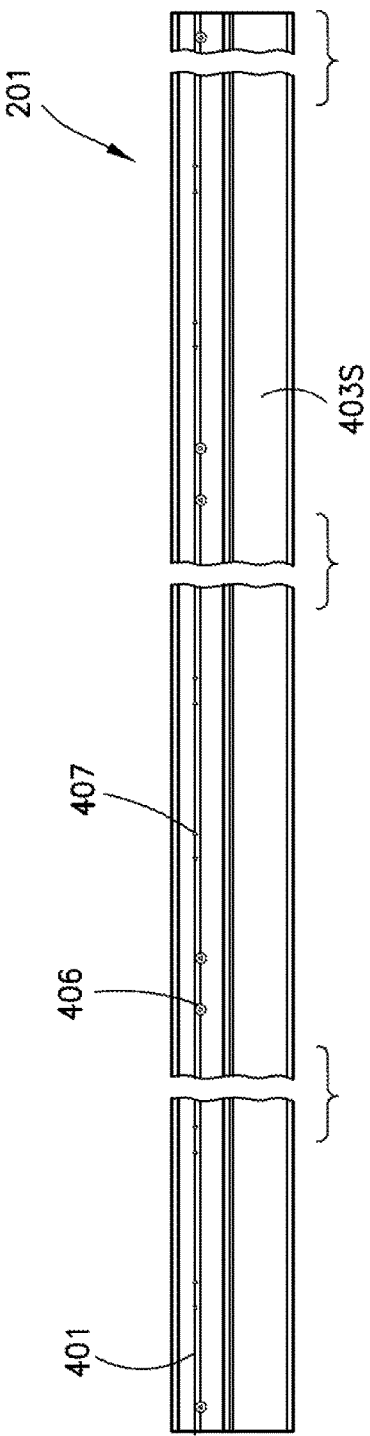

Referring now to FIGS. 2, 3A and 3B, as noted above, the storage structure 130 may include a multilevel storage structure including an array of stacked storage locations. Each array may include vertical support members 200 to which rover travel rails 201A-201n (generally referred to as rover rails 201) are fixed. The rover rails 201 may define storage levels and transport levels. The rover rails 201 may form a riding surface for the rover 110 to travel along through, for example, the picking aisles 130A or any other suitable location of the automated storage and retrieval system. The rover rails 201 may support the rover within, e.g., the picking aisles 130A during payload transfer between the rover 110 and the storage locations. Accordingly, the rover rails 201 may be subject to static and cyclic loads from rover 110 activity including the rover traversing the picking aisles 130A to and from rack storage locations, transferring payloads to and from storage locations (which may include pickface building at the shelf). Cyclic loading on the rover rails 201 may create fatigue conditions that may be amplified by dynamic storage distribution (as described in, e.g., U.S. patent application Ser. No. 12/757,337 filed on Apr. 9, 2010 the disclosure or which is incorporated herein by reference in its entirety) along the aisles. As such, the rover rails 201 may include or otherwise incorporate fatigue resistant features corresponding to any suitable predetermined lifetime loading of the rover rails 201. The fatigue resistant features may be configured so that a stress at or surrounding the fatigue resistant features is below a predetermined value.

The rover travel rails 201 may be fixed to the vertical support members 200 in any suitable manner. In one aspect the rover rails 201 may be fixed to the vertical support members using any suitable upper mounting bracket 202U and any suitable lower mounting bracket 202L. In another aspect, the rover rails 201 may be fixed to the vertical support members 200 with an adjustable mounting bracket in a manner similar to that described below with respect to FIG. 6. Here the mounting brackets 202U, 202L each have an angle iron shape (e.g. an "L" shape) but in other aspects the mounting brackets 202U, 202L may have any suitable shape and be constructed of any suitable material. The mounting brackets 202U, 202L may be fixed to the vertical support members 200 using any suitable fasteners including but not limited to rivets, bolts, clips, screws, snaps, welding or any other suitable mechanical and/or chemical fasteners or adhesives. The rover rails 201 may be fixed to the mounting brackets 202U, 202L in any suitable manner such as in a manner substantially similar to that described above between the mounting brackets 202U, 202L and the vertical support members 200.

Referring now to FIGS. 4A-4D each of the rover rails 201 may be, for example, one piece members of unitary construction formed by any suitable manufacturing process such as cold rolling. The rover rails may be disposed on opposite lateral sides of a picking aisle 130A and extend longitudinally along a length of the picking aisle 130A for allowing the rover 110 to travel along the length of the picking aisle 130A. The rover rails 201 may have any suitable length such that in one aspect, the rover rails 201 have a length substantially equal to a length of a respective picking aisle 130A, while in other aspects the rover rails 201 are placed end to end for spanning a length of the respective picking aisle 130A. The rover rails 201 may include a fatigue resistant vertical profile portion 400. The vertical profile portion 400 may have any suitable shape such as, for example, a closed box section with one or more axis of symmetry that provides static and dynamic stability. The vertical profile portion 400 may define or otherwise include flanges 401, 402 for, e.g., fastener engagement to the vertical support members 200 and/or the storage shelves 130S (FIG. 1). The flanges 401, 402 may be referred to as upper and lower flanges respectively. The upper and lower flanges 401, 402 may include fatigue resistant apertures 406 through which suitable fasteners, such as those described above, are inserted for fixing the respective mounting brackets 202U, 202L to the rover rail 201 in any suitable manner. The upper flange 401 may also include fatigue resistant apertures 407 through which suitable fasteners, such as those described above, are inserted for fixing the storage shelves 130S to the rover rail 201 in any suitable manner.

The one piece rover rail 201 may also define a fatigue resistant flange 403 that extends from a face 404 of the vertical profile portion 400 and provides a travel/riding and support surface 403S for, e.g., wheels of the rover 110 during rover operation. The flange 403 may have any suitable width W for allowing, e.g., wheels of the rover to travel along the flange 403. The face 404 may also include integral rover position determination features 405. The integral rover position determination features 405 may have any suitable shape and size such that the rover position determination features 405 are fatigue resistant. In one aspect the integral rover position determination features 405 may be apertures or protrusions formed in the face 404 having a shape and size for minimizing stress concentrations in the face 404. The integral rover position determination features 405 are illustrated as having a general rectangular shape but in other aspects the integral rover position determination features 405 may have any suitable shape. In one aspect the rover 110 may include any suitable sensors for detecting the rover position determination features 405 and determine its position along the picking aisle 130A based on at least the rover position determination features 405. In other aspects the position of the rover 110 within the picking aisle may be determined in any suitable manner. One example of determining the position of the rover can be found in U.S. patent application Ser. No. 13/327,035, filed on Dec. 15, 2011 (now U.S. Pat. No. 9,008,884), the disclosure of which is incorporated herein by reference in its entirety.

Figure 5:
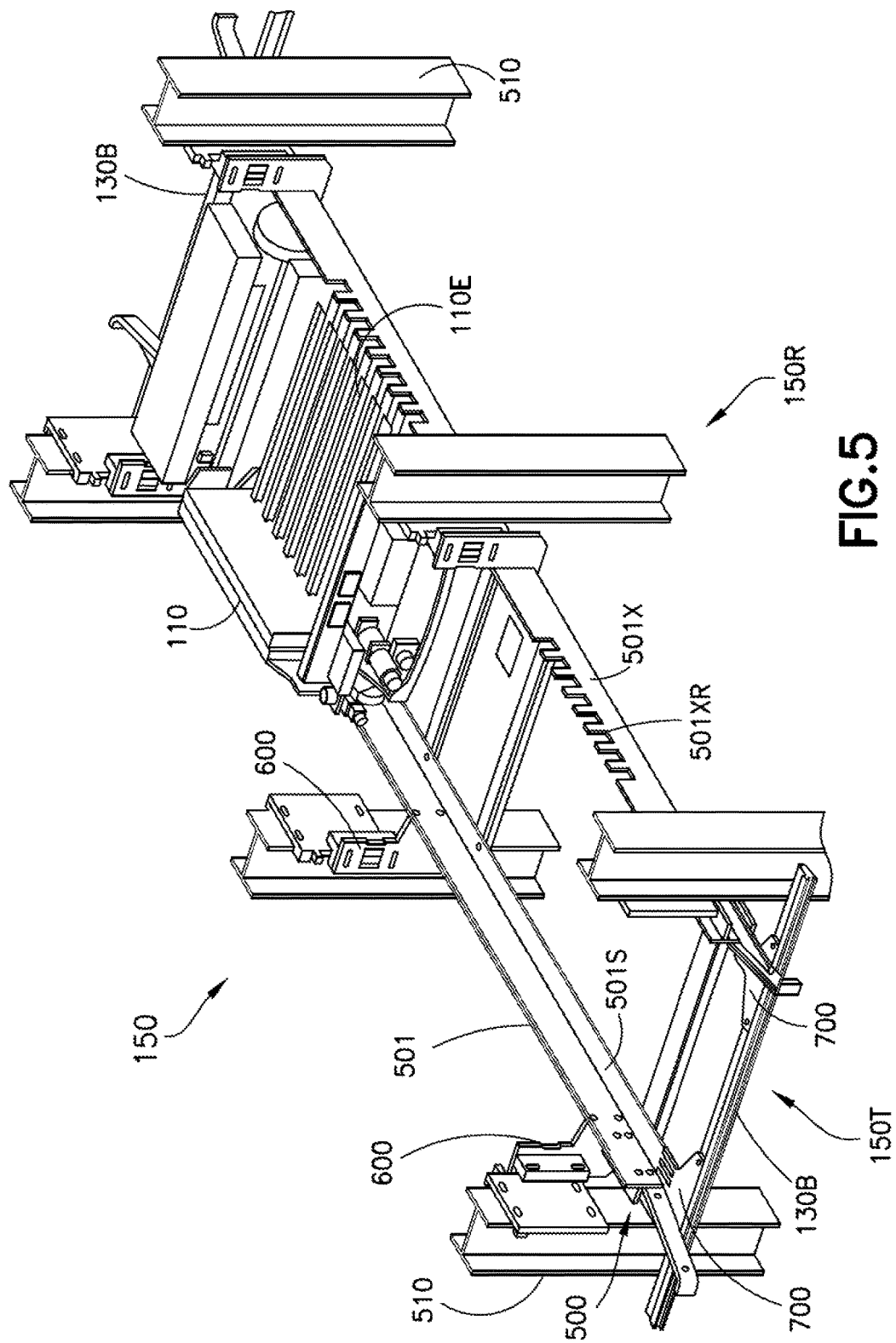
FIG. 5 is a schematic illustration of a portion of the automated storage and retrieval system in accordance with aspects of the disclosed embodiment.

Referring now to FIG. 5 one or more structural components of the automated storage and retrieval system 100 (such as the transfer deck 130B, picking aisles 130A, lift modules 150, etc.) may have transport sections, upon which the rover 110 travels, with different flexure, static and dynamic properties such that one or more of the structural components reacts differently to, e.g., a seismic event or other event (generally referred to as a seismic event) that may cause movement of items within their respective storage locations. A compliant interface 500 between the structural components may allow for relative movement of the structural components during the seismic event. The compliant interface 500 may be self-aligning following the seismic event and provide a riding surface over which the rover 110 can transition between the transport sections of the different structural components. It is noted that the compliant interface 500 will be described with respect to a transition between the lift module 150 and transfer deck 130B but it should be understood that the interface described herein may be placed at a transition between any two structural components of the automated storage and retrieval system. For example, the compliant interface 500 may provide a transition between one or more of a picking aisle 130A and the transfer deck 130B, between a picking aisle 130A and a lift module 150 (e.g. where the picking aisle provides substantially direct access to the lift module), and/or between any other suitable structures of the automated storage and retrieval system 100.

In one aspect the lift modules 150 (a portion of which is shown in FIG. 5) may be modular. For example, each lift module 150 may include a vertical lift portion (not shown) and a rover interface portion 150R which can be mated to, for example, the transfer deck 130B in any suitable manner. In one aspect each lift module 150 may include vertical supports 510. The vertical lift portion (not shown) may be coupled to the vertical supports 510 in any suitable manner. Rover rails 501, 501X may also be fixed to the vertical supports 510 at vertical intervals corresponding to each storage level of the automated storage and retrieval system 100. Each of the rover rails 501, 501X may be substantially similar to rover rails 201 described above and include rover travel/riding and support surface 501S, however one or more of rover rails 501, 501X may include recessed or cut out portions 501XR that provide clearance for an end effector 110E of the rover 110 to extend for interfacing with a transfer shelf of the vertical lift portion for transporting items between storage levels or into/out of the storage structure 130. The rover rails 501, 501X may be disposed on opposite lateral sides of a lift travel aisle 150T and extend longitudinally along a length of the lift travel aisle 150T.

Figure 6:
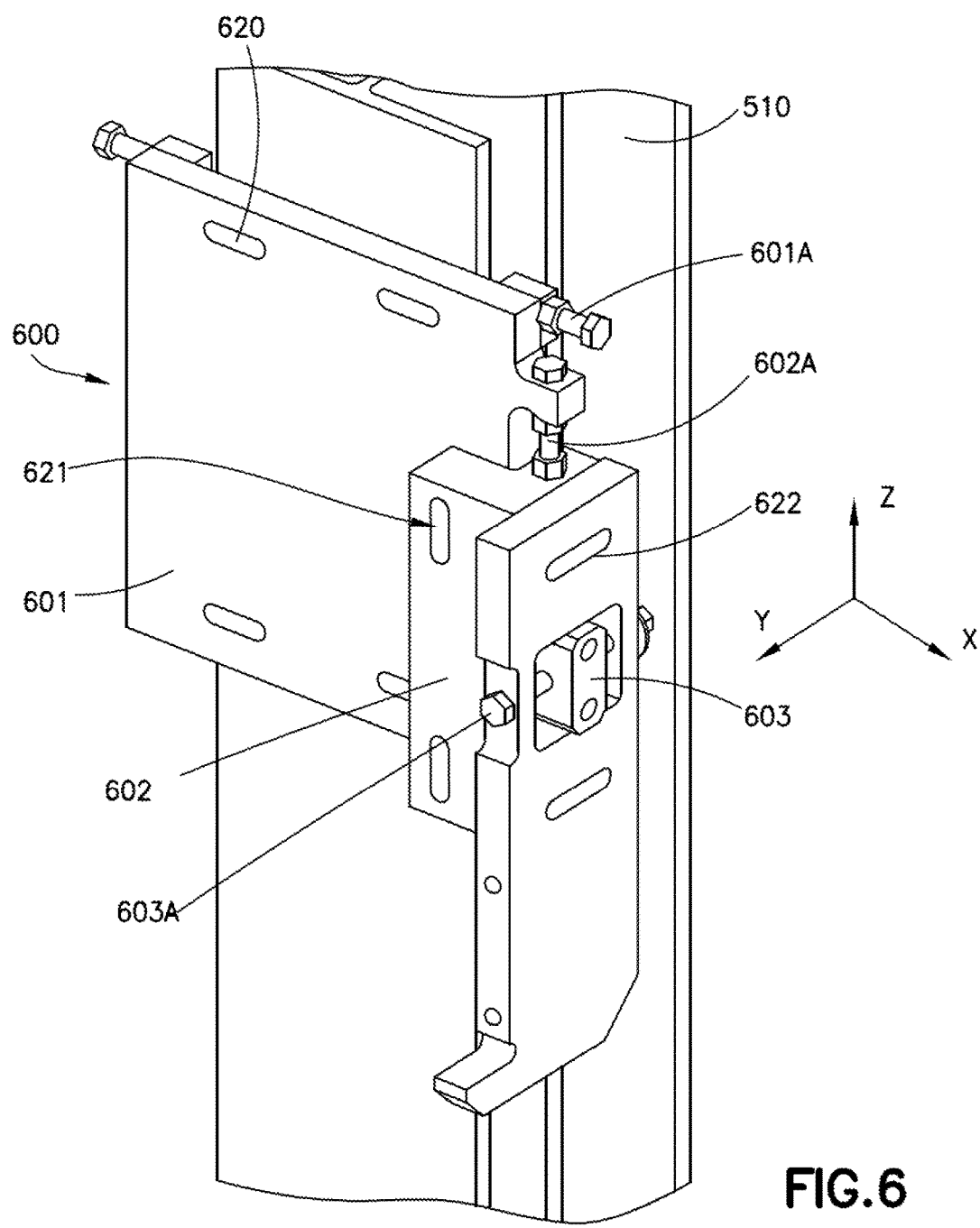
FIG. 6 is a schematic illustration of a rover travel rail mounting bracket in accordance with aspects of the disclosed embodiment.
Figure 7:
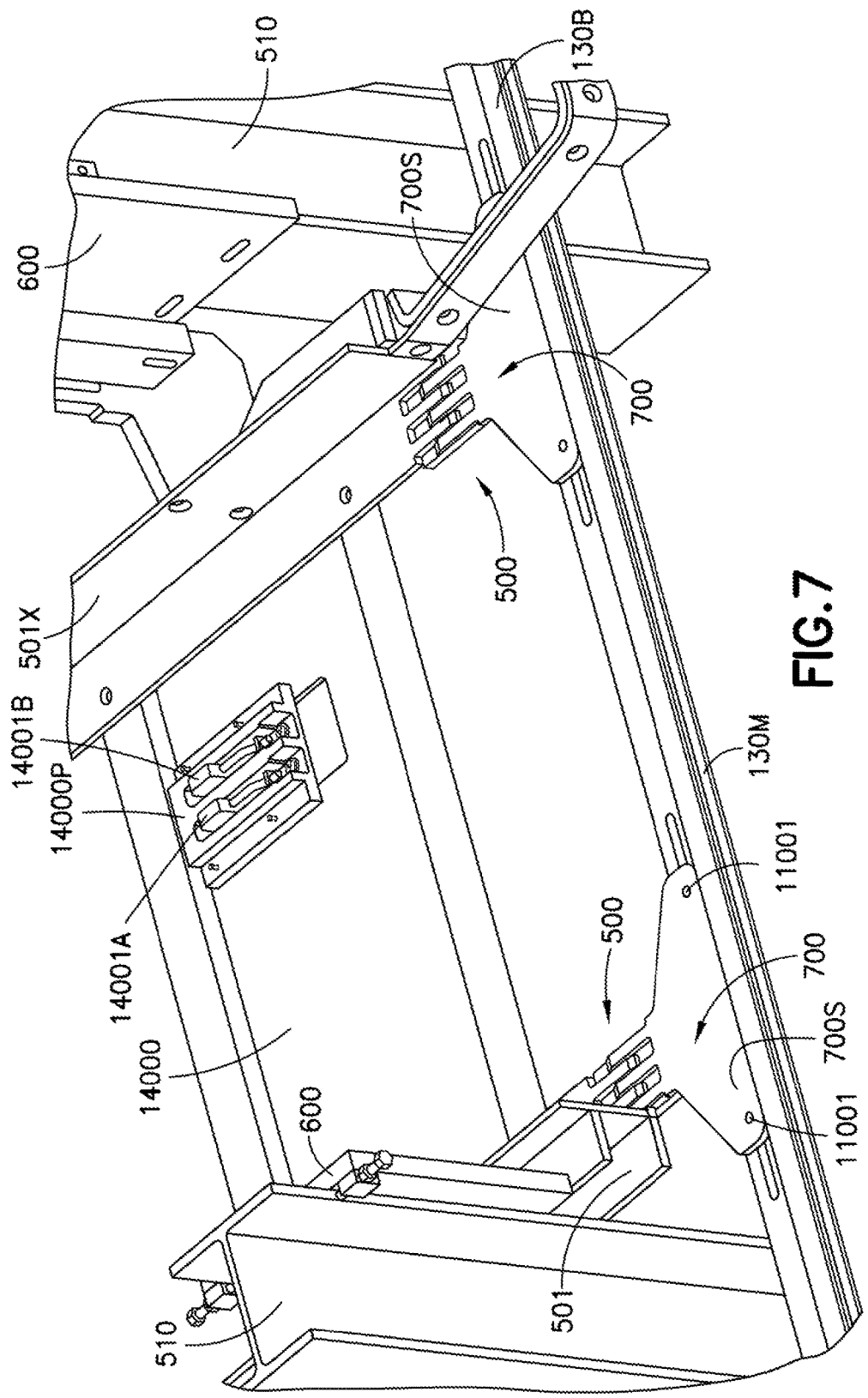
FIGS. 7, 8 and 9 are schematic illustrations of a portion of the automated storage and retrieval system in accordance with aspects of the disclosed embodiment.
Figure 8:
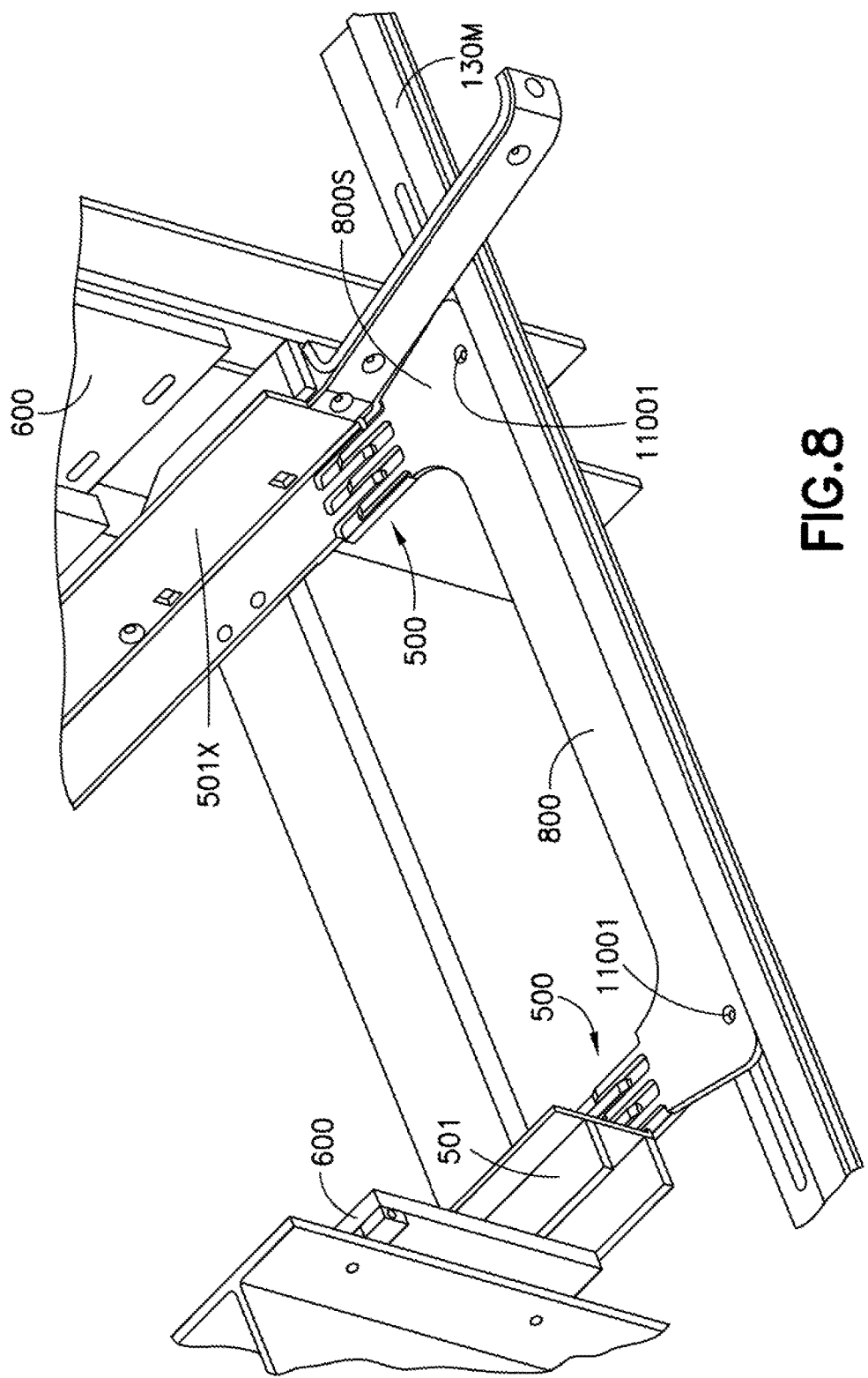
Figure 9:
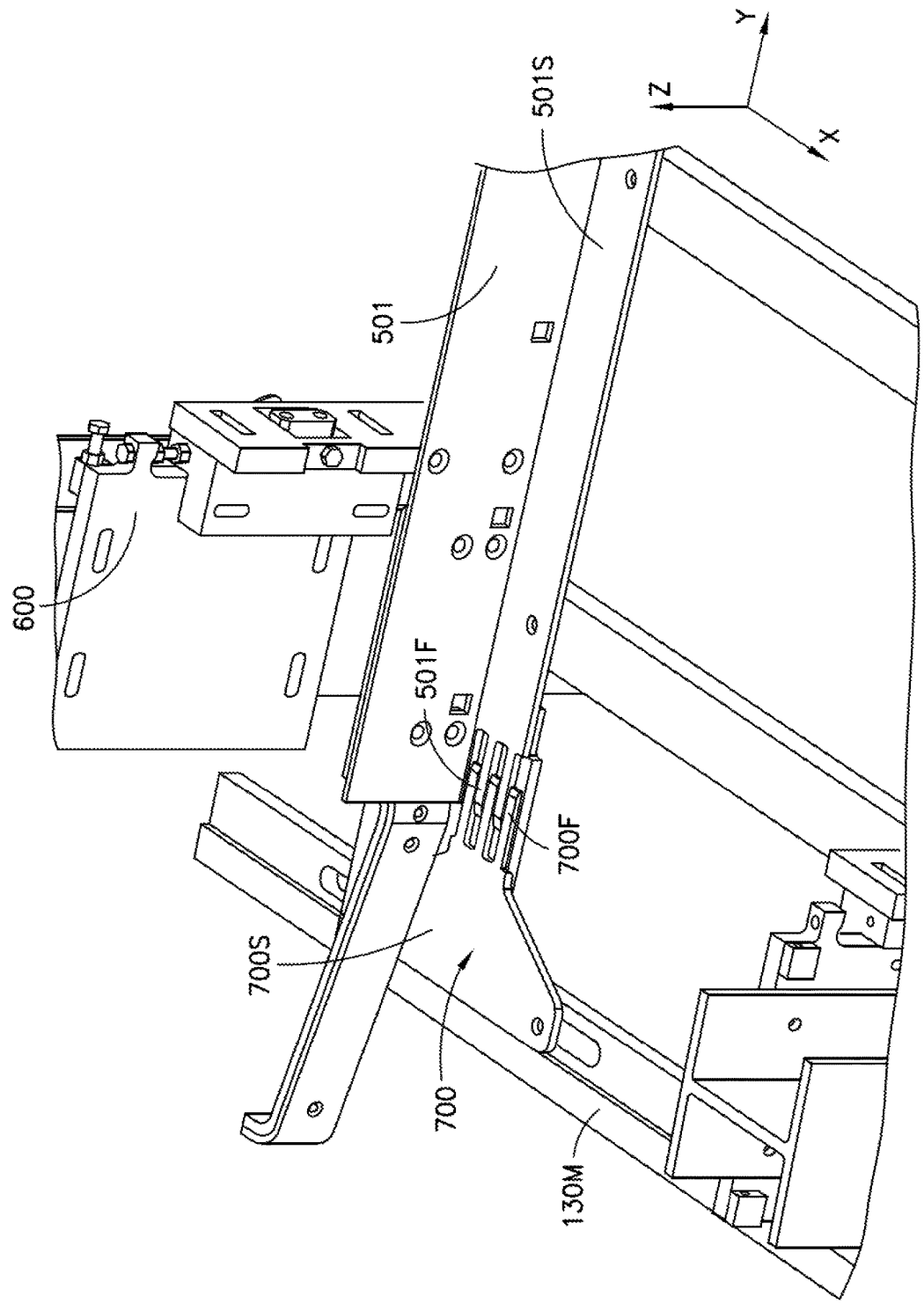

Also referring to FIG. 6 the rover rails 501, 501X may be substantially rigidly fixed to the vertical supports 510 in any suitable manner. In one aspect the rover rails 501, 501X may be adjustably fixed to the vertical supports 510 through adjustable mounting members 600. The mounting member 600 may allow three degree of freedom adjustment of each respective rover rail 501, 501X. In other aspects the mounting members 600 may provide adjustment of the respective rover rail along any suitable number of linear and/or rotational axes. The mounting member 600 may allow for alignment of the respective rover rail 501, 501X with the transfer deck 130B and/or other platforms on which the rover travels. Each direction of adjustment of the mounting member 600 may have a locking mechanism for fixing the respective direction and rigidly securing the rover rail 501, 501X to, for example, the vertical supports 510.

In one aspect each mounting member 600 includes a first support plate 601 that interfaces with, for example, vertical support 510 in any suitable manner for securing the first support plate 601 to the vertical support member 510. The first support plate 601 may include elongate mounting apertures 620 through which fasteners may be inserted for securing the first support plate 601 to the vertical support 510. The first support plate 601 may be movable relative to, for example, the vertical support 510 or other suitable feature of the automated storage and retrieval system 100, in the X direction. Locking members 601A may releasably engage the vertical support 510 for substantially preventing movement of the first support plate 601 in the X direction. A second support plate 602 may also include elongate mounting apertures 621 and be movably mounted to the first support plate 601 in any suitable manner so that the second support plate 602 is movable relative to the first support plate 601 (or other suitable feature of the automated storage and retrieval system 100) in the Z direction. Locking members 602A may releasably engage the first support plate 601 for substantially preventing movement of the second support plate 601 in the Z direction. A third support plate 603 may also include elongate mounting apertures 622 and be movably mounted to the second support plate 602 in any suitable manner so that the third support plate 603 is movable relative to the second support plate 602 (or other suitable feature of the automated storage and retrieval system 100) in the Y direction. Locking members 603A may releasably engage the second support plate 602 for substantially preventing movement of the third support plate 603 in the Y direction. It is noted that the X, Y and Z axes are used for explanatory purposes only and that each of the first, second and third support plates 601, 602, 603 may be movable along any suitable respective axis in any suitable reference frame.

Referring now to FIGS. 7-10, the rover travel/riding surfaces of the automated storage and retrieval system (e.g. such as surfaces 501S, 403S of the rover rails 201 and the surface of the transfer deck 130B) may be isolated from one another with one or more intermediate or compliant isolation plates 700 that are robust and long lasting. These isolation plates 700 are also shown in FIG. 5 between each lift module 150 rail 501, 501X and the transfer deck 130B (only a portion of which is shown in the Figs.) for isolating the rails 501, 501X from the transfer deck 130B. The isolation plates may also provide the complaint interface 500, which is formed of a jointed or articulated connection that is released to provide at least one degree of freedom of movement between, e.g., the transfer deck 130B and lift module 150 rails 501, 501X as will be described below. The compliant interface 500 may substantially prevent chafing between automated storage and retrieval system structural elements. While the isolation plates 700 are shown as being located at the interface between the rails 501, 501X and the transfer deck 130B it should be understood, however, that these isolation plates 700 may be located at any structural joint between any two adjacent rover transport surfaces. The joint elements (which will be described below) of the compliant interface 500 form a substantially continuous and smooth surface upon which the rover 110 travels between the different portions of the automated storage and retrieval system 100.

Figure 10:
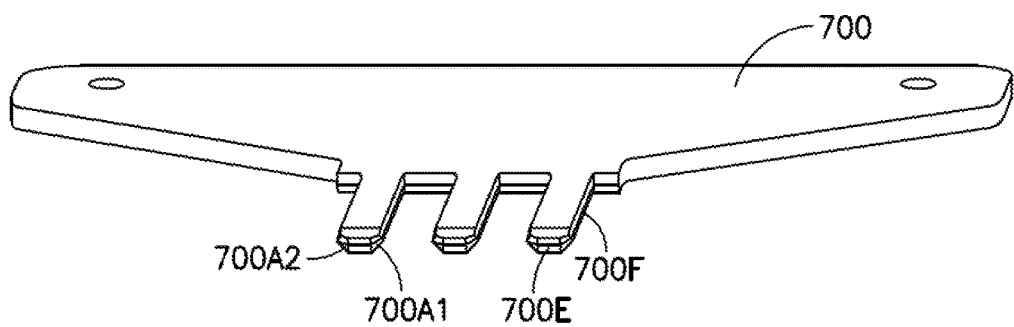
FIGS. 10, 11A-11C, 12A-12B and 13 are schematic illustrations of portions of a compliant interface in accordance with aspects of the disclosed embodiment.

As can be seen in FIGS. 7-10 in one aspect the isolation plates 700 may include more than one isolation plate 700 such that each interface 500 at, e.g. the rails rail 501, 501X has a respective isolation plate 700. In other aspects the isolation plates may be a single, one piece plate 800 such that each interface 500 at the rails 501, 501X has a common isolation plate 800. The isolation plates 700, 800 may be constructed of any suitable material and have any suitable configuration. In one aspect the isolation plates 700, 800 and the rails 501, 501X may each include fingers 700F, 501F that interleave with each other or other suitable structure, such as flexible membranes and/or slip plates, that allow for movement between the plates 700, 800 and rails 501, 501X and are configured to provide or otherwise include a riding surface for a rover 110 passing over the compliant joint 500. In one aspect as can be seen in FIG. 10 the fingers of the isolation plates 700, 800 may include tapered sides 700A1, 700A2 and/or a tapered end 700E or any other suitable alignment features to assist in the recovery of the compliant joint 500 after a seismic event or other movement of the automated storage and retrieval system structure. As may be realized the fingers 501F of the rails 501, 501X may be tapered in a complimentary manner to that of the fingers 700F to also assist in the recovery of the compliant joint 500 after a seismic event or other movement of the automated storage and retrieval system structure.

Figure 11A:
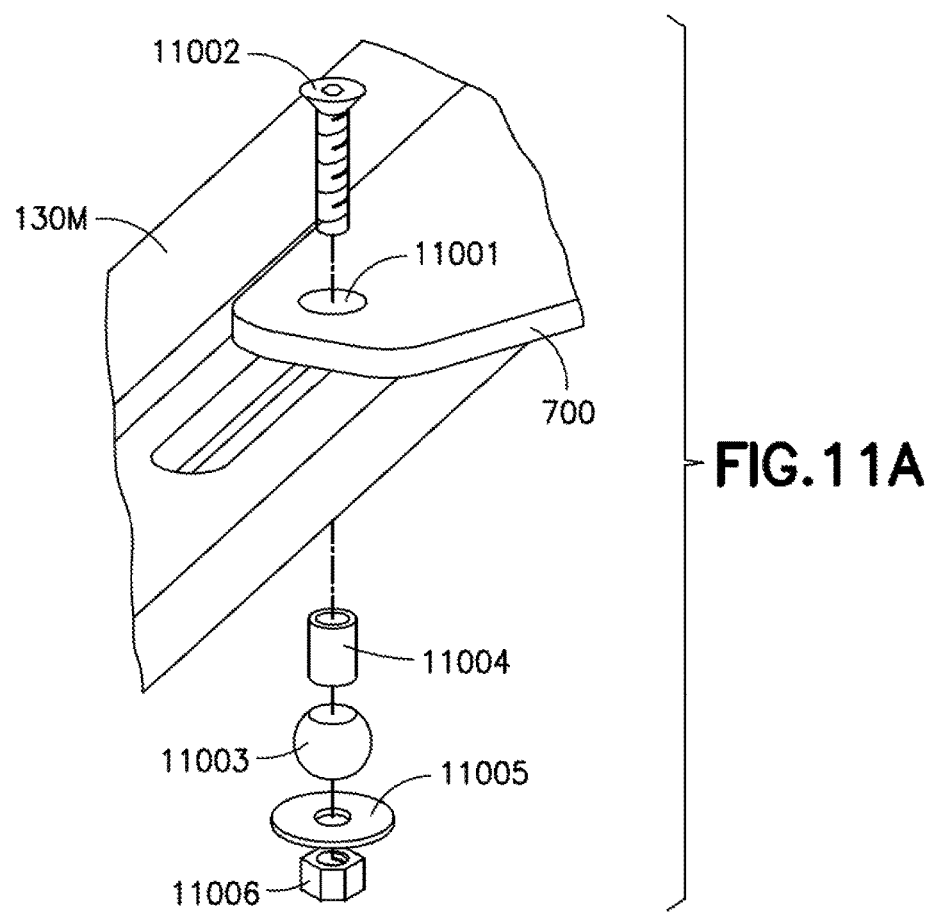
Figure 11B:
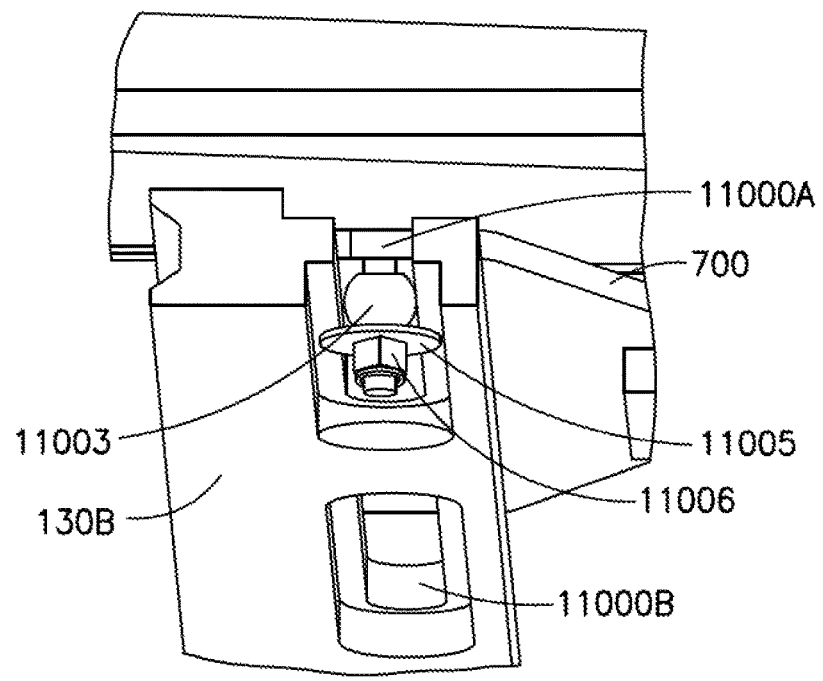
Figure 11C:
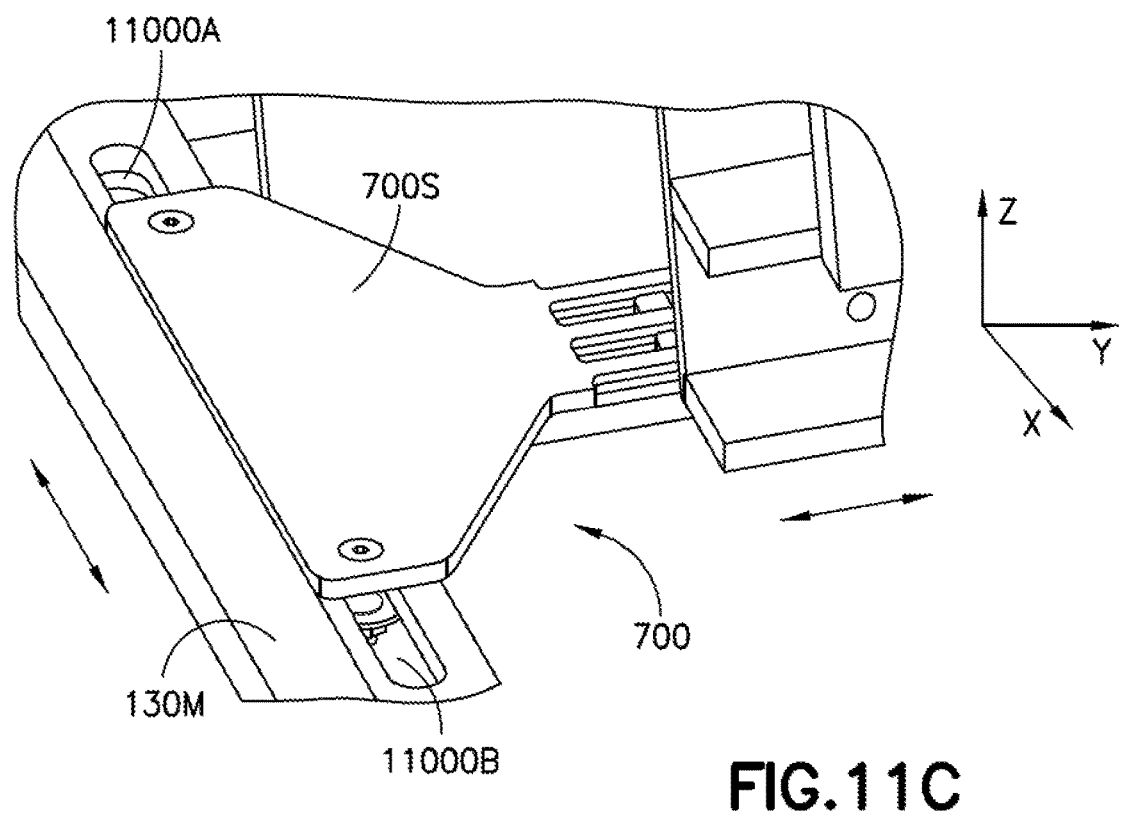

Referring also to FIGS. 11A-11C, the isolation plates 700, 800 may be substantially stiff members that are coupled to the transport deck 130B (or other suitable member within the automated storage and retrieval system such as any rover transport surface or isolation plate support members or bars 130M) to allow for at least one degree of freedom of movement between the transport deck 130B and, for example, rover rails 501, 501X (or other rover transport/riding surface). In one aspect the isolation plates 700, 800 may be mounted to provide three or more degrees of freedom of movement (e.g. X, Y, Z and/or rotation about one or more of the X, Y and X axes). The isolation plates 700, 800 may be mounted in any suitable manner that allows compliant movement of the isolation plate 700, 800. In one aspect a ball type joint (as will be described below) or any other suitable articulated joint may be used to mount the isolation plate 700, 800 to any suitable support surface. For example, the transfer deck 130B (or any other suitable structural element of the automated storage and retrieval system) may include a slot or other aperture, as will be described below, in which a ball is disposed and the isolation plate may be mounted to the ball (e.g. so a ball and socket joint is formed).

The isolation plates 700 (isolation plate 800 may be mounted and function in a manner substantially similar to that described herein for isolation plates 700) may be mounted to, for example, any suitable portion of the transfer deck 130B such as support member 130M in any suitable manner. In one aspect the isolation plate 700 may be mounted to the support member 130M with a ball joint or otherwise articulated connection that allows pivotal movement of the isolation plate as will be described in greater detail below. Each isolation plate 700 may include apertures 11001 through which any suitable fasteners 11002 are inserted. The support member 130M may include elongated apertures 11000A, 11000B through which the fasteners 11002 pass such that the isolation plate is disposed on a first or upper side of the support member 130M. A ball member 11003 may be placed over the fastener from a second or bottom side of the support member 130M so that the ball member 11003 is located within a respective aperture 11000A, 11000B. The ball member 11003 may have any suitable diameter that allows pivoting movement within and linear movement of the ball member 11003 along a length of the aperture 11000A, 11000B. A bushing or spacer member 11004 may be inserted within the ball member 11003 to substantially prevent contact between the fastener 11002 and the ball member 11003 and to substantially prevent deformation of the ball when a retaining member 11006 is affixed to the fastener for retaining the ball member 11003 within the aperture 11000A, 11000B. In one aspect the fastener 11002 is a screw and the retaining member 11006 is a nut but in other aspects any suitable elongated member and retaining members may be used such as, for example rods and clips, snaps and/or pins. A washer or other substantially flat or obstructive member 11005 may be placed between the retaining member 11006 and the ball member 11003. The obstructive member 11005 may have a diameter or may otherwise be larger than a width of the aperture 11000A, 11000B so as to substantially prevent the ball member 11003 and retaining member 11006 from passing through the aperture 11000A, 11000B such that the isolation plate 700 is restrained from being lifted from the support member 130M. In other aspects the retaining member 11006 may be configured to both retain the ball member 11003 on the fastener 11002 and substantially prevent the lifting of the isolation plate 700 from the support member 130M. As can be seen in FIG. 11B the aperture 11000A, 11000B may include a recess on the second side of the support member 130M into which the retaining member 11006 and obstructive member 11005 are disposed. In other aspects the aperture 11000A, 11000B may not include a recess.

Figure 12A:
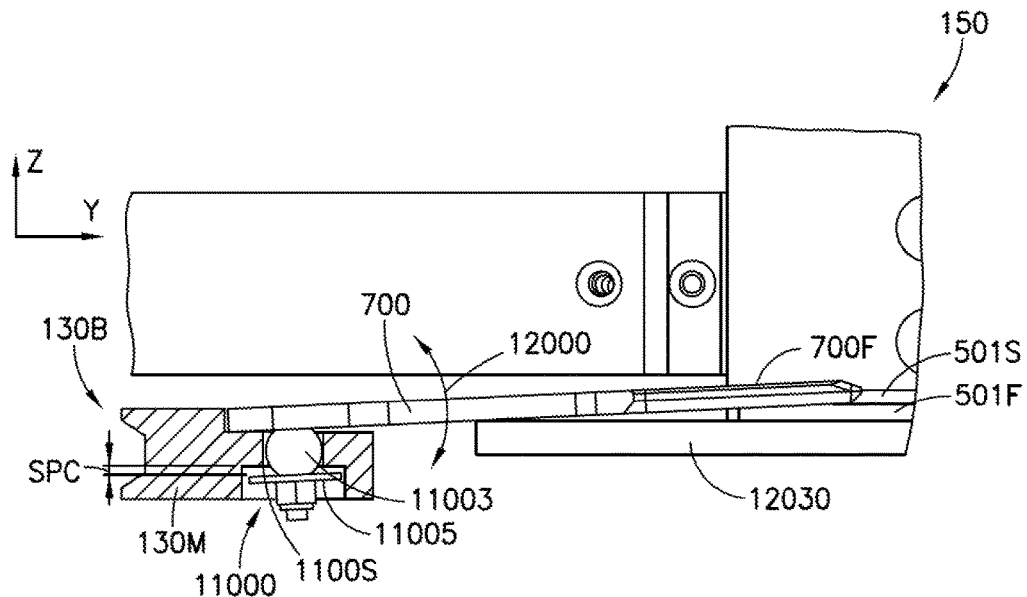
Figure 12B:
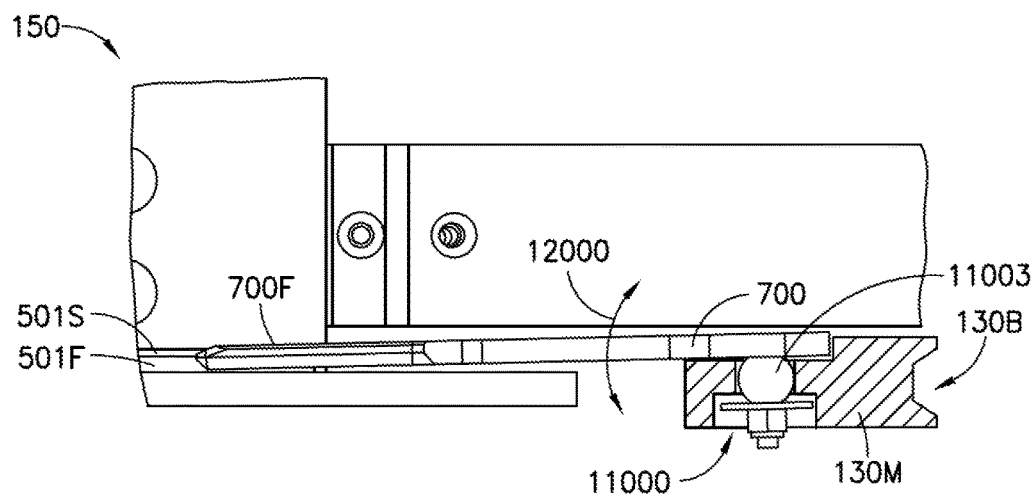

Referring now to FIGS. 11C, 12A and 12B the interleaved fingers 700F, 501F (FIG. 9) may substantially prevent movement of the isolation plate 700 in, for example, the X direction while allowing relative movement of the isolation plate 700 and the rails 501, 501X in the Y direction. The elongated apertures 11000A, 11000B, however, may allow movement of the isolation plate 700 relative to, for example, the support member 130M and transfer deck 130B in the X direction but may not allow relative movement between the isolation plate 700 and the transfer deck 130B/support member 130M in the Y direction. For example, the ball member, as noted above, may move along the length of the slot allowing the isolation member to move relative to the support member 130M and transfer deck 130B. In other aspects the isolation plate 700 may be mounted such that linear movement within the slot is fixed (e.g. the isolation plate substantially does not move along a length of the slot). As such, the combination of the interleaved fingers 700F, 501F and the elongated apertures 11000A, 11000B/ball joint provide relative movement between the transfer deck 130B and the rails 501, 501X in at least both the X and Y directions.

Further degrees of freedom of movement are provided by the ball joint such that the isolation member 700 is allowed to pivot about the ball member 11003 within the elongated aperture 11000A, 11000B (generally referred to as elongated apertures 11000). Referring to FIGS. 12A and 12B relative movement between, for example, the transfer deck 130B and the lift module 150 rover transport/riding surfaces in the Z direction may cause pivoting movement of the isolation member 700 about the ball joint in the direction of arrow 12000. For example, as noted above, the ball member 11003 may allow the isolation member 700 to pivot relative to the support member 130M (and the transfer deck 130B). As the transfer deck 130B and the lift module 150 rover transport/riding surfaces move relative to one another in the Z direction so that the riding surface 501S of the rover rails 501, 501X (FIG. 5) is located above the transfer deck riding surface, the isolation plate 700 contacts the fingers 501F causing the isolation member fingers 700F (and the isolation plate as a whole) to pivot upwards as shown in FIG. 12A. As the transfer deck 130B and the lift module 150 rover transport/riding surfaces move relative to one another in the Z direction so that the riding surface 501S of the rover rails 501, 501X (FIG. 5) is located below the transfer deck riding surface, e.g., the cantilevered weight of the isolation plate 700 causes the isolation plate to pivot downwards as shown in FIG. 12B. It is noted that the ball joint between the isolation member 700 and the support member 130M may also allow for substantially pure Z axis motion where a space SPC is provided between the obstructive member 11005 and a surface 11000S of the elongated aperture 11000. It is noted that a support member 12030 may be fixed to the rails 501, 501X below the fingers 501F to at least substantially prevent flexure (e.g. in combination with the interleaved fingers) of one or more of the fingers 501F and isolation plate 700 as the rover 110 travels over the rover riding surface formed by the compliant interface. In other aspects the rails 501, 501X may not include the support member 12030.

Figure 13:
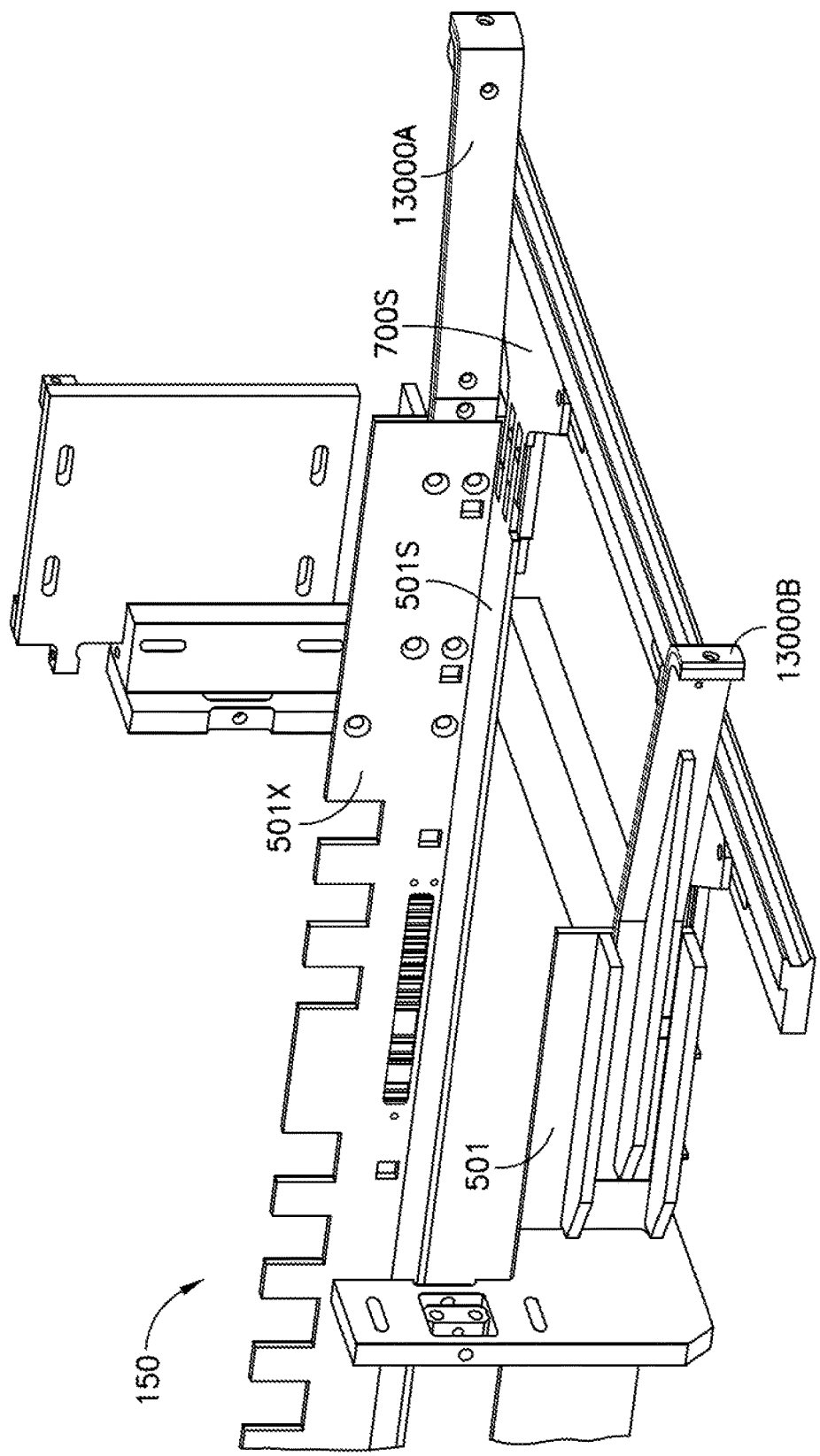

Referring to FIG. 13 one or more lead-ins or guides 13000A, 13000B may be fixed to the lift module 150 rails 501, 501X at a proximate end of the guides 13000A, 13000B in any suitable manner for guiding the rover 110 into the lift module 150. The guides 13000A, 13000B may form a funnel like passage, the width of which is narrower at the rails 501, 501X than at the mouth of the passage (e.g. at the distal ends of the guides 13000A, 13000B). In one aspect each of the guides 13000A, 13000B may have a single, one piece or unitary construction while in other aspects each guide may be constructed of multiple pieces that are fixed to one another in any suitable manner such as welding or through mechanical or chemical fasteners. The guides may be positioned above the rover transport/riding surface of the transfer deck 130B so that the guides 13000A, 13000B are able to move with the lift module rails 501, 501X relative to the transfer deck 130B substantially free from contact with the transfer deck 130B.

Referring now to FIGS. 7 and 14A-14C the lift module 150 may include a rover charging station 14000 fixed to the rails 501, 501X and/or vertical supports/columns 510 of the lift module so that the charging station 14000 moves with the lift module 150 during, for example, a seismic event. In other aspects the charging station 14000 may be disposed at any suitable location within the automated storage and retrieval system. Suitable examples of rover charging stations can be found in, for example, U.S. patent application Ser. No. 13/326,823 filed on Dec. 15, 2011 (now U.S. Pat. No. 9,082,112) and U.S. Provisional Patent Application No. 61/798,282 filed on Mar. 15, 2013; U.S. patent application Ser. No. 14/209,086 filed on Mar. 13, 2014; U.S. patent application Ser. No. 14/209,261 filed on Mar. 13, 2014 the disclosures of which are incorporated herein by reference in their entireties. The charging station 14000 may include a contact or charging pad 14000P that includes compliant contacts 14001A, 14001B (generally referred to as compliant contacts 14001). The compliant contacts 14001A, 14001B may interface with rover charging contacts 14003A, 14003B (generally referred to as rover charging contacts 14003) for charging the rover 110. As may be realized, the rovers 110 rest on the lift module 150 rails 501, 501X and may move during, e.g., a seismic event. The compliant contacts 14001A, 14001B of the charging station 14000 may be configured to remain in contact with the rover charging contacts 14003A, 14003B during movement of the rover 110 relative to the charging station 14000. As can be seen in FIGS. 14A and 14B, each compliant contact 14001 may be disposed at least partly within a recess of the charging pad 14000P. The compliant contact 14001 may include a contact portion 14010 and a shaft portion 14011 connected to the contact portion 14010. The shaft portion 14011 may be pivotally mounted to the charging pad 14000P in any suitable manner so that the contact portion 14010 moves in the direction of arrow 14020. A resilient or biasing member 14012 is disposed between a surface 14000S of the charging pad 14000P and, for example, the contact portion 14010 (or any other suitable portion of the compliant contact 14001) for biasing the contact portion away from the surface 14000S. As the rover 110 drives onto the charging station 14000 the rover charging contact 14003 pushes the contact portion 14010 of the compliant contact 14001 towards the surface 14000S such that the biasing member 14012 pushes the contact portion 14010 against the rover charging contact 14003. The distance through which the contact portion 14010 is pushed is such that the upward travel of the contact portion 14010 is sufficient to allow the contact portion 14010 to remain in contact with the rover charging contact 14003 during movement of the rover 110 relative to the rails 501, 501X during a seismic event. As can be seen in FIGS. 14A and 14B the rover charging contacts 14003, 14003' may have any suitable shape and/or configuration to allow for nonbinding contact as the rover charging contact 14003, 14003' interfaces with the compliant contact 14001.

In accordance with one or more aspects of the disclosed embodiment an automated storage and retrieval system is provided. The automated storage and retrieval system includes an autonomous rover; and a multilevel rack structure. The multilevel rack structure includes columns connected by rail beams transversely spanning between the columns. The rail beams define storage and transport levels and provide riding surfaces for the autonomous rover. The rail beams include integral fatigue resistant rover location apertures.

In accordance with one or more aspects of the disclosed embodiment, the autonomous rover includes sensors for detecting the rover location apertures.

In accordance with one or more aspects of the disclosed embodiment, the rail beam members include fatigue resistant connections for coupling the rail beam members to the columns.

In accordance with one or more aspects of the disclosed embodiment an automated storage and retrieval system having autonomous rovers is provided. The automated storage and retrieval system includes a first automated storage and retrieval section having respective structural dynamic properties and a first rover support surface upon which the autonomous rovers travel; a second automated storage and retrieval section having respective structural dynamic properties and a second rover support surface upon which the autonomous rovers travel; and a released interface disposed between the first and second rover support surfaces. The released interface being configured to allow relative movement between the first and second rover support surfaces, and provide an interface support surface upon which the autonomous rovers travel, the interface support surface extending between the first and second rover support surfaces.

In accordance with one or more aspects of the disclosed embodiment the released interface includes an interface portion connected to one of the first or second rover support surface; and at least one movable plate movably connected to another one of the first or second rover support surface, the at least one moveable plate and the interface portion being configured to releasably engage one another for providing the interface support surface. In other aspects the interface portion includes first fingers integrally formed with the one of the first or second rover support surface and the at least one movable plate includes second fingers that are interleaved with the first fingers. In still other aspects the first rover support surface comprises at least one rover guide rail of a vertical lift module and the second rover support surface comprises a transfer deck surface. In yet another aspect the interface portion comprises two interface portions and the at least one movable plate comprises a movable plate for releasably engaging a respective one of the two interface portions. In still another aspect the interface portion comprises two interface portions and the at least one movable plate comprises a single plate for releasably engaging the two interface portions. In another aspect the at least one movable plate is movably coupled to the another one of the first or second rover support surface with at least a two-degree of freedom coupling.

In accordance with one or more aspects of the disclosed embodiment the automated storage and retrieval system includes at least one vertical lift module; and a transfer deck in communication with the at least one vertical lift module; wherein the first automated storage and retrieval section comprises the at least one vertical lift module and the second automated storage and retrieval section comprises the transfer deck. In another aspect wherein the at least one vertical lift module includes a frame, rover guide rails, and an adjustable rail mounting bracket coupling the rover guide rails to the frame. In one aspect the adjustable rail mounting bracket is configured to provide adjustment in three degrees of freedom. In another aspect the at least one vertical lift module comprises a rover charging station including compliant contacts configured to engage the autonomous rovers.

In accordance with one or more aspects of the disclosed embodiment the respective structural dynamic properties of the first automated storage and retrieval section are different than the respective structural dynamic properties of the second automated storage and retrieval section.

In accordance with one or more aspects of the disclosed embodiment an automated storage and retrieval system having autonomous rovers is provided. The automated storage and retrieval system includes at least one vertical lift module having at least one travel surface upon which the autonomous rovers travel; a transfer deck in communication with the at least one vertical lift module, the transfer deck including a transfer deck surface upon which the autonomous rovers travel; and a released interface releasably connecting the at least one travel surface and the transfer deck surface, the released interface forming an autonomous rover riding surface extending between the at least one travel surface and the transfer deck surface.

In accordance with one or more aspects of the disclosed embodiment the at least one vertical lift module includes a frame, and a rail mounting bracket configured to adjustably couple the at least one travel surface to the frame.

In accordance with one or more aspects of the disclosed embodiment the at least one vertical lift module comprises a rover charging station including compliant contacts configured to engage the autonomous rovers.

In accordance with one or more aspects of the disclosed embodiment the released interface includes an interface portion connected to one of the at least one travel surface or the transfer deck surface; and at least one movable plate movably connected to another one of the at least one travel surface or the transfer deck surface, the at least one moveable plate and the interface portion being configured to releasably engage one another and provide the autonomous rover riding surface. In another aspect the interface portion includes first fingers integrally formed with the at least one travel surface or the transfer deck surface and the at least one movable plate includes second fingers that are interleaved with the first fingers. In yet another aspect the interface portion comprises two interface portions and the at least one movable plate comprises a movable plate for releasably engaging a respective one of the two interface portions. In still another aspect the interface portion comprises two interface portions and the at least one movable plate comprises a single plate for releasably engaging the two interface portions. In another aspect the at least one movable plate is movably coupled to the another one of the at least one travel surface or the transfer deck surface with at least a two-degree of freedom coupling.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated storage and retrieval system comprising: an autonomously guided rover vehicle; and
a multilevel rack structure, the multilevel rack structure including columns connected by rail beams transversely spanning between the columns, where the rail beams define different storage and transport levels each of which have different corresponding rail beams arranged in horizontal substantially parallel pairs so that the autonomously guided rover vehicle at each different storage and transport level rides the corresponding substantially parallel pairs of rail beams of that storage and transport level and each of the rail beams, corresponding to each storage and transport level, has a cross-section that couples the rail beam to a column joint, and
the cross-section forms an integral riding surface of the rail beam upon which the autonomously guided rover vehicle rides the rail beam so that the autonomously guided rover vehicle is supported wholly by riding surfaces of the substantially parallel pairs of the rail beams at the corresponding transport level and traverses each different storage and transport level of the multilevel rack structure riding on the riding surfaces, and
the cross-section forms integral fatigue resistant rover location apertures in the rail beam wherein the integral fatigue resistant rover location apertures in the rail beam are disposed and have a configuration established based on fatigue resistance to autonomously guided rover vehicle induced load cycles in the riding surfaces.

2. The automated storage and retrieval system of claim 1, wherein the autonomously guided rover vehicle includes sensors for detecting the integral fatigue resistant rover location apertures.

3. The automated storage and retrieval system of claim 1, wherein the rail beams include fatigue resistant connections for coupling the rail beams to the columns.

4. The automated storage and retrieval system of claim 1, wherein the integral fatigue resistant rover location apertures include an encoder.

5. An automated storage and retrieval system comprising: an autonomously guided rover vehicle; and
a multilevel rack structure, the multilevel rack structure including columns connected by rail beams transversely spanning between the columns, where the rail beams define different storage and transport levels each of which have different corresponding rail beams so that the autonomously guided rover vehicle at each different storage and transport level rides the corresponding rail beams of that storage and transport level and each of the rail beams corresponding to each storage and transport level includes riding surfaces for the autonomously guided rover vehicle so that the autonomously guided rover vehicle is supported by and traverses each different storage and transport level of the multilevel rack structure riding on the riding surfaces, and integral fatigue resistant rover location apertures in the rail beam wherein the integral fatigue resistant rover location apertures in the rail beam are disposed and have a size and shape determined by fatigue resistance to autonomously guided rover vehicle induced load cycles in the riding surfaces.

6. The automated storage and retrieval system of claim 5, wherein the autonomously guided rover vehicle includes sensors for detecting the integral fatigue resistant rover location apertures.

7. The automated storage and retrieval system of claim 5, wherein the rail beams include fatigue resistant connections for coupling the rail beams to the columns.

8. The automated storage and retrieval system of claim 5, wherein the integral fatigue resistant rover location apertures include an encoder.

9. An automated storage and retrieval system comprising:
a multilevel rack structure with columns connected by substantially rigid rail beams transversely spanning between the columns, the substantially rigid rail beams define different storage and transport levels each of which have different corresponding substantially rigid rail beams so that an autonomously guided rover vehicle at each different storage and transport level rides the corresponding substantially rigid rail beams of that storage and transport level, the substantially rigid rail beams include beam riding surfaces for the autonomously guided rover vehicle so that the autonomously guided rover vehicle is supported by and traverses the multilevel rack structure riding on the beam riding surfaces;
a transport deck with a deck riding surface, for the autonomously guided rover vehicle, connected to the columns and interfaced with the substantially rigid rail beams through mating isolation plates; and
an adjustable coupling joining the substantially rigid rail beams with the columns, the adjustable coupling having three degrees of freedom adjustment to position isolation plates of the substantially rigid rail beams relative to isolation plates of the transport deck.

10. The automated storage and retrieval system of claim 9, wherein the substantially rigid rail beams include integral fatigue resistant rover location apertures.

11. The automated storage and retrieval system of claim 10, wherein the integral fatigue resistant rover location apertures are disposed and have a configuration established based on the autonomously guided rover vehicle induced load cycles in the riding surfaces.

12. The automated storage and retrieval system of claim 10, wherein the integral fatigue resistant rover location apertures include an encoder.

13. The automated storage and retrieval system of claim 9, wherein the adjustable coupling provides adjustment along at least one of a linear axis and a rotational axis.

14. The automated storage and retrieval system of claim 9, wherein the adjustable coupling includes at least one locking mechanism configured to rigidly secure the substantially rigid rail beams to the columns.

15. The automated storage and retrieval system of claim 9, wherein the adjustable coupling includes a first, second and third support plate.

16. The automated storage and retrieval system of claim 15, wherein
the first support plate is movably mounted to the columns,
the second support plate is movably mounted to the first support plate, and
the third support plate is movably mounted to the second support plate.

17. The automated storage and retrieval system of claim 16, wherein the first, second and third support plates are movably mounted in the X, Z and Y direction respectively.

18. The automated storage and retrieval system of claim 9, wherein the mating isolation plates include fingers that interleave with each other.

19. The automated storage and retrieval system of claim 18, wherein the fingers include a riding surface for the autonomously guided rover vehicle to pass over the interleaved fingers of the mating isolation plates.

20. The automated storage and retrieval system of claim 9, wherein the mating isolation plates are mounted with a ball type joint.

* * * * *